United States Patent Office 3,277,671
Patented Oct. 11, 1966

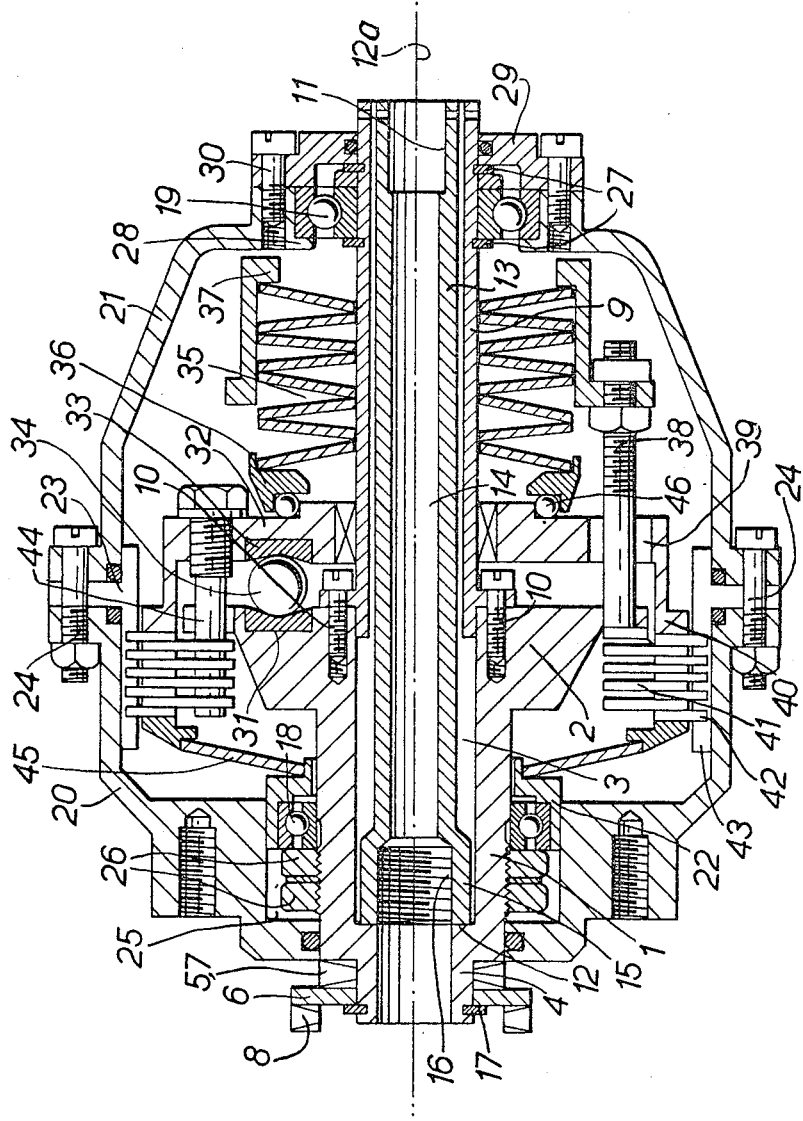

3,277,671
CLUTCH ASSEMBLIES
Ronald Francis Winstone and Dennis Hornby, Cheltenham, England, assignors to S. Smith & Sons (English) Limited, London, England, a British company
Filed June 11, 1964, Ser. No. 374,358
8 Claims. (Cl. 64—30)

This invention relates to clutch assemblies of the kind in which means are provided to limit the torque which may be transmitted from the driving member to the driven member.

According to this invention a clutch assembly of the kind referred to comprises a driving member, an intermediate member, and a driven member all rotatable about a common axis, spring means arranged to urge the intermediate member towards the driving and driven members, and round rigid bodies, each round rigid body being disposed so as to engage a recess which has outwardly diverging walls, in each of the driving and intermediate members, the intermediate and driven members being formed with friction surfaces disposed so that they are urged into contact with each other by the spring means.

When the driving member is rotated, torque is transmitted from it to the intermediate member through the round rigid bodies, and from the intermediate member to the driven member through the friction surfaces. As the members rotate, a force is exerted tending to make the bodies ride out of the recesses, and a force is exerted on the intermediate member by the bodies which acts in a direction such as to move the intermediate member away from the driving and driven members and whose magnitude is dependent on the torque transmitted. This force has the effect that it reduces the force acting to hold the friction surfaces together and therefore reduces the torque that may be transmitted through the friction surfaces. When the torque transmitted exceeds a certain level, the forces which act to hold the friction surfaces together are reduced sufficiently to allow the surfaces to slip.

Preferably the clutch assembly also comprises further spring means arranged to urge the driven member towards the intermediate member.

Preferably the stiffness of the further spring means is greater than that of the spring means arranged to urge the intermediate member.

Preferably the force exerted by the spring means arranged to urge the intermediate member is adjustable.

Preferably the recesses are cone shaped and the bodies are spherical.

A clutch assembly of the kind referred to in accordance with this invention will now be described with reference to the accompanying drawing.

Referring to the drawing, the clutch assembly has a generally cylindrical externally threaded member 1 which is integrally formed with a disc 2 (constituting the aforementioned driving member) at its right hand end and has a stepped bore 3 providing a shoulder 12. The diameter of the left hand end of the member 1 is reduced to provide a hollow cylinder 4. The cylinder 4 is provided with external dog teeth 5 which are engageable with dog teeth 7 formed on an annular disc 6 carried by the cylinder 4. The disc 6 is freely rotatable on the cylinder 4 but its axial movement away from the dog teeth 5 is restrained by a retaining clip 17 on the cylinder 4. The disc 6 is formed with further dog teeth 8 on the opposite side to the dog teeth 7 which are designed to engage dog teeth driven by a servo motor as will be explained. A hollow cylinder 9 is secured to the disc 2 by screws 10 and is coaxial with the member 1, the common axis being denoted by the reference numeral 12a. A bored cylindrical bolt 13 rests within the bore 3 and the cylinder 9, the bore having at its left end a widened portion 15 which has an internal thread 16 and being formed into a hexagonal socket 11 at its right end.

The member 1 is intended to be coupled to the output shaft of a servo motor, which has dog teeth designed to engage the dog teeth 8, and an externally threaded spigot designed to mate with the threaded portion 15. The member 1 is coupled to the output shaft of the servo motor by fitting the dog teeth 8 into the dog teeth of the servo motor, by fitting the dog teeth 5 into the dog teeth 7, and by screwing the bolt 13 onto the spigot until the bolt 13 rests against the shoulder 12, the right hand end of the bolt 13 then being flush with the right hand end of the cylinder 9.

The member 1 and the cylinder 9 are rotatable within ball bearings 18 and 19 respectively, carried by the clutch assembly casings which consists of two cup shaped members 20 and 21. The members 20 and 21 and a ring 23 which is disposed between them, are held together by bolts 24. The inner race of the bearing 18 is slidably mounted on the member 1 and the outer race is fitted into a ring 22 itself slidably fitted into a hollow cylinder 25 formed in the member 20. The inner and outer races of the bearing 18 are prevented from moving to the left by nuts 26 screwed onto the member 1, and are prevented from moving to the right by the ring 22. The inner race of bearing 19 is retained on the cylinder 9 by circlips 27, and the outer race is retained on the member 21 by an annular shoulder 28 formed on the member 21 and by an annular end cap 29 fixed to the member 21 by screws 30.

The disc 2 has fitted into it, three hardened steel bushes 31 which are symmetrically disposed about the axis 12a and are formed with conical recesses. A disc 32 is rotatably mounted on the cylinder 9 and has fitted into it three hardened steel bushes 33 similar to those of the disc 2 and symmetrically disposed about the axis 12a at the same radius as the bushes 31 in disc 2. The angular position of the disc 32 shown is such that the bushes 31 and 33 face one another, and hardened steel balls 34 are disposed so that they engage the conical recesses of the bushes 31 and 33. The disc 32 is urged towards the disc 2 by a pack of Belleville spring washers 35, one end of which bears against a thrust bearing 36. The thrust bearing 36 is rotatable about the axis 12a and transmits the forces of the Belleville spring washers 35 to the disc 32 through ball bearings 46. The other end of the pack of Belleville spring washers 35 bears against a further thrust bearing 37 which is attached to the disc 2 by three bolts 38 which pass through arcuate slots 39 in the disc 32. Drive is transmitted from the disc 32 to the ring 23 by what is effectively a multi-plate friction clutch. Five annular friction plates 42 retained by two tongues 43 projecting from the ring 23 engage a friction surface formed on an annular extension 40 of disc 32 and four annular friction plates 41 retained by three pins 44 screwed to the disc 32. A Belleville spring washer 45, one end of which engages the ring 22 and the other end of which engages one of the plates 42, urges all the friction surfaces of the extension 40 and the plates 41 and 42 into engagement with each other. The stiffness of the Belleville spring washer 45 is very much greater than that of the pack of Belleville spring washers 35.

In use, the member 1 and the disc 2 are driven by the servo motor, and the drive is transmitted through the balls 34 to the disc 32. The drive is transmitted from the disc 32 to the ring 23 by the friction surfaces of the extension 40 and the plates 41 and 42. A force is exerted by the balls 34 on the disc 32 reducing the force with which the friction surfaces are urged into engagement with each other and thereby reducing the torque which can be transmitted by the friction surfaces. When the torque transmitted exceeds a certain level, the force with which the friction surfaces are urged into contact with each other is reduced sufficiently to allow them to slip. The torque level at which slip takes place is dependent on the coefficient of friction of the friction surfaces, the angle of the conical recesses of the bushes 31 and 33, the radius of the balls 34 and their distances from the axis 12a and the stiffness of the pack of Belleville spring washers 35 and the Belleville spring washer 45. The torque level at which slip takes place changes if the coefficient of friction of the friction surfaces changes, but not to the same extent. For example, if the coefficient of friction is increased by about 50% the torque level at which the friction surfaces slip may be increased by as little as 15%. The drive is transmitted from the ring 23 to other members by a component (not shown) secured to the member 21.

The torque level at which slip takes place may be altered by screwing the nuts 26 along the member 1 thus altering the forces exerted by the spring washers.

Having thus described our invention, we claim:

1. A clutch assembly comprising a driving member, an intermediate member, and a driven member, means mounting all of said members for rotation about a common axis, one of said driving and driven members being formed with a plurality of first recesses having outwardly diverging and stepless walls, said intermediate member being formed with a plurality of second recesses also having outwardly diverging and stepless walls positioned in facing relation to said first recesses respectively, a plurality of round rigid bodies disposed respectively between said facing pluralities of recesses, each of said round rigid bodies being disposed so as to engage one of said first recesses and one of said second recesses, first spring means operative to urge said intermediate member toward said one of said members and into engagement with the other one of said driving and driven members, and second spring means operative to urge said other one of said members into surface engagement with said intermediate member, the engaging surfaces of said intermediate member and said other one of said members being friction surfaces.

2. A clutch assembly as claimed in claim 1 wherein the stiffness of said second spring means is greater than that of said first spring means.

3. A clutch assembly as claimed in claim 1 including means for adjusting the force exerted by said first spring means.

4. A clutch assembly as claimed in claim 1 wherein said intermediate member and said other one of said members both comprise a plurality of friction surfaces which are urged into contact with each other.

5. A clutch assembly as claimed in claim 1 wherein said first and second recesses are cone shaped and said bodies are spherical.

6. A clutch assembly is claimed in claim 1 wherein said one of said members comprises a disc, said engaging surfaces being annular and surrounding said disc.

7. A clutch assembly as claimed in claim 1 wherein said first spring means comprises a Belleville spring washer.

8. A clutch assembly as claimed in claim 1 wherein said second spring means comprises a Belleville spring washer.

References Cited by the Examiner

UNITED STATES PATENTS

| | | | |
|---|---|---|---|
| 1,632,539 | 6/1927 | Chilton | 64—30 |
| 2,587,712 | 3/1952 | Dodge | 64—30 X |

FOREIGN PATENTS 430,562   6/1926   Germany.

FRED C. MATTERN, Jr., *Primary Examiner.*

HALL C. COE, *Examiner.*